Oct. 15, 1935.　　　　E. M. LOCKE　　　　2,017,347
MOWING MACHINE
Filed Aug. 24, 1934　　　2 Sheets-Sheet 2

INVENTOR
E. M. Locke
BY
ATTORNEY

UNITED STATES PATENT OFFICE 2,017,347

MOWING MACHINE

Edward Moore Locke, Lockeford, Calif.

Application August 24, 1934, Serial No. 741,251

2 Claims. (Cl. 56—218)

This invention relates to agricultural implements, and particularly to horse drawn mowing machines. The principal object of my invention is to lessen the drag and strain on the animals attached to the machine by the provision of an adjustable draft connection so that the mower and its tongue may be properly balanced when the mower is being pulled irrespective of the overhanging weight of the driver which tends to throw the mower out of balance; a means to take the weight of the tongue off the collars of the animals when the mower is standing idle and the driver has dismounted; and a means to adjust the grass board of the mower according to the setting of the mower blade so that the board may be maintained in the same position relative to the ground at all times and the accompanying drag and side strains on the animals will be lessened.

A further object is to provide a device for the above purpose which can be made to fit any standard mower and which may be easily applied thereto in place of the present equipment without making any alterations to the mower structure itself.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 4 is a fragmentary side elevation of a grass board and shoe showing the adjustable connection therebetween.

Figure 1:
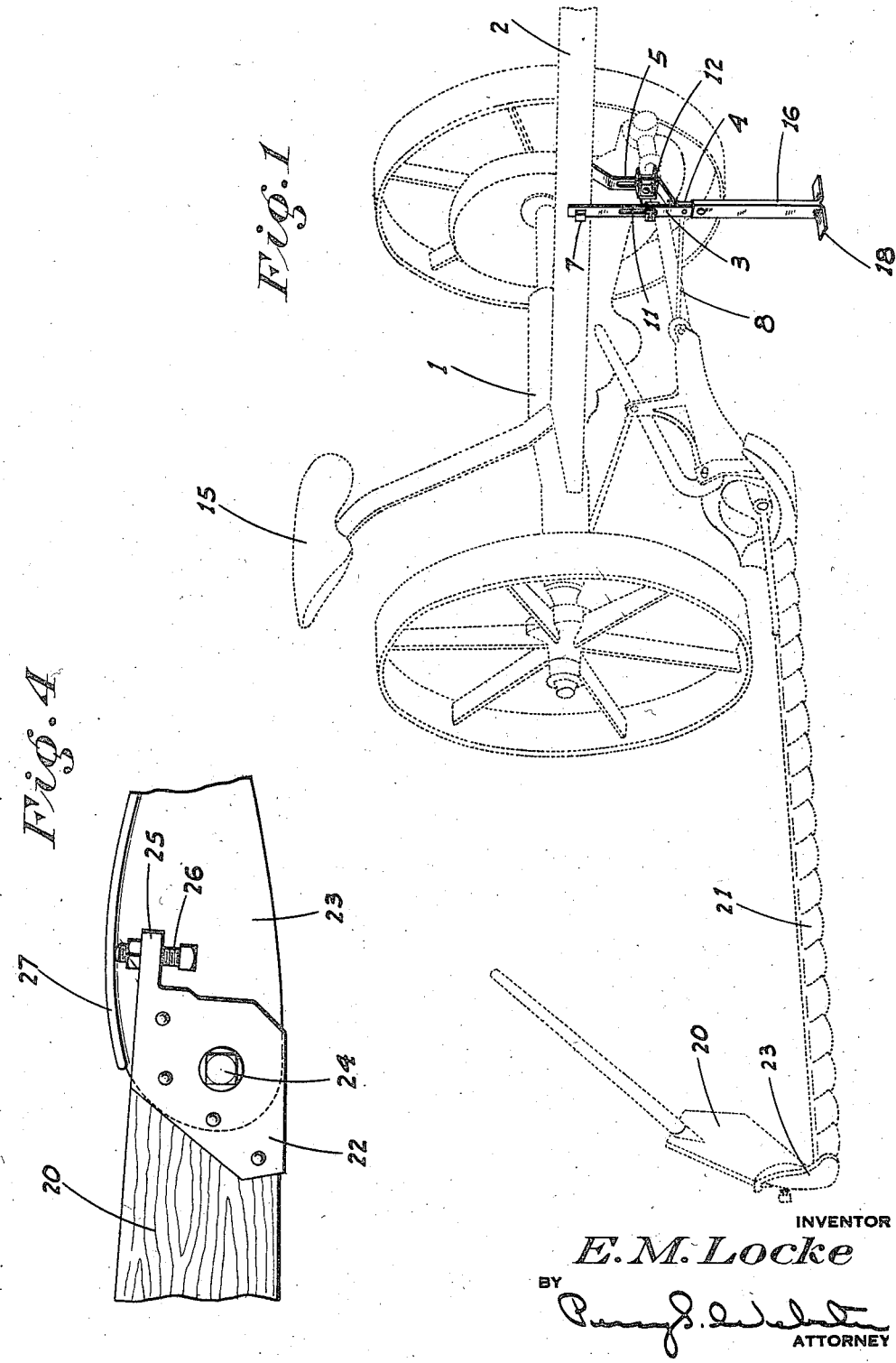
Figure 1 is a perspective outline of a standard horse drawn mower showing my improved adjustable draft and tongue supporting unit attached thereto.

Referring now more particularly to the characters of reference on the drawings, the mower, indicated generally at 1, has a tongue 2 projecting forwardly as usual, said tongue extending between the draft animals and of course serving as a support for a portion of the harness.

My improved adjustable draft connection and tongue supporting unit, which takes the place of the usual draft connection and is disposed in the same location, comprises a substantial U-shaped frame consisting of a straight vertical arm 3 and another arm 4 engaging and rigidly connected to the arm 3 at its lower end. Said arm 4 diverges upwardly relative to the arm 3 from its lower end in such a manner that it has a portion 5 spaced considerably from and parallel to the arm 3 near its lower end, and another portion 6 above the portion 5 also parallel to the arm 3 but spaced therefrom a greater distance than the portion 5. The upper end of the arm 3 and said portion 6 of the arm 4 are adapted to straddle the tongue and to be clamped thereto by a bolt 7 in the customary manner, so that the frame unit is disposed in depending relation to the tongue.

Adjacent its lower end this unit is connected to the mowing mechanism by a tension rod 8, which is the same one now used with the ordinary draft connecting device. A horizontal substantially U-shaped forwardly facing yoke 9 slidably engages the arm portion 5 and the corresponding portion of the arm 3 for vertical movement relative thereto. Said yoke is clamped in any position by bolts 10 mounted in the sides of the yoke and projecting laterally through vertical slots 11 in the arm members 3 and 5.

A clevis 12 or similar element adapted for connection to a doubletree projects forwardly from between the sides of the yoke and is connected to the back of the latter by a bolt or pin 13. This pin is slidable through the yoke and preferably has a compression spring 14 thereon rearwardly of the yoke so as to absorb the shock of any sudden pull on the clevis.

By means of this construction it will be evident that the height of the point of pull relative to the ground and to the tongue may be altered to suit different conditions, particularly the weight of the driver occupying the rearwardly overhanging seat 15 on the mower. The position of this seat is such that the weight of a heavy man exerts a considerable upward pull on the front end of the tongue. By adjusting the point of pull of the draft animals with the machine however this upward pull is counteracted, when the mower is in motion, so that a better balance of the mower and a lessening of the uneven strains on the animals is obtained.

Figure 2:
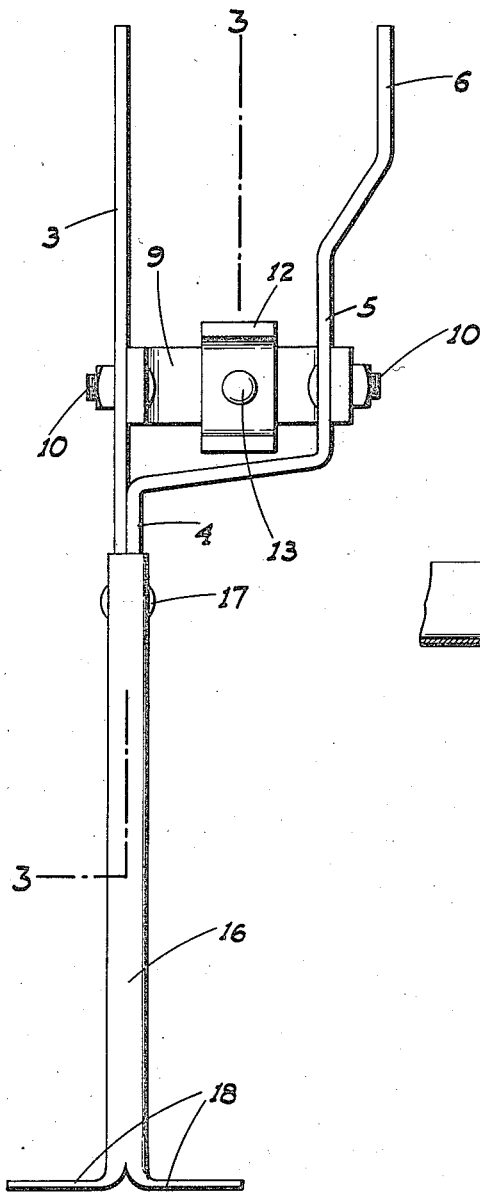
Figure 2 is a front elevation of said unit detached.

To support the tongue when the mower is not in operation and the driver's seat is unoccupied, so as to relieve the down drag of the tongue on the animals, I mount a leg 16 on the draft unit. This leg is preferably of U-shaped form in cross section and straddles the lower ends of the arms 3 and 4 where they engage each other, being pivoted thereto by a bolt 17 or the like. At its lower end the leg is formed with opposed transversely extending flat feet 18 so as to provide a sufficiently large ground engaging area to prevent the leg possibly sinking into the ground with the weight of the tongue. The leg may be lowered to a vertical ground engaging position, as shown in Figures 1 and 2, and is prevented from movement beyond a vertical position in one direction by the back of the U-shaped leg which engages one edge of the draft frame.

Figure 3:
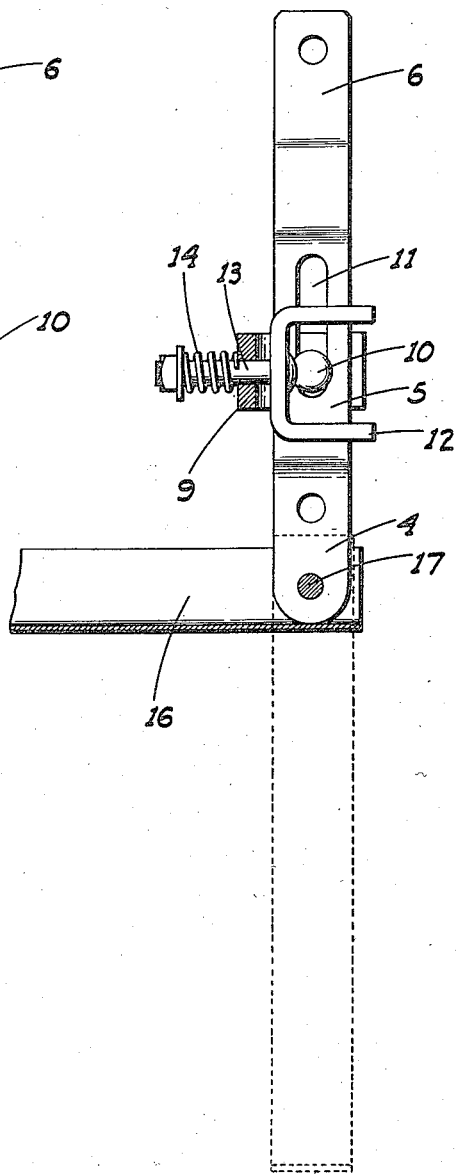
Figure 3 is a sectional elevation of the same taken on the line 3—3 of Figure 2 showing the tongue supporting member raised.

In the other direction however the leg may be swung upwardly and rearwardly as shown in Figure 3 so as to be then out of the way when the mower is in operation.

In order to eliminate the drag of the grass board 20 on the ground when the cutter unit 21 of the mower is tilted to make a high cut, I mount a metal sheath 22 over the forward end of the board, on which sheath the outer shoe 23 of the cutter unit is pivoted by a bolt 24. A lug 25 projects forwardly from the upper end of the sheath and has a vertical set screw 26 adjustably mounted therein. The upper end of this set screw engages the laterally overhanging flange 27 of the shoe. In this manner by advancing or retracting the screw the grass board will be tilted up or down about the pivot bolt 23 so that its lower edge may be maintained in a predetermined constant relationship with the ground irrespective of the tilting of the cutter unit and shoe 23, which of course is rigid with said unit as usual.

It is to be understood that while I have shown this device as being designed to fit a certain standard make of machine, it can by relatively unimportant changes in size be made to fit all the various machines of this character, without departing from or interfering with the inventive features.

Having thus described my invention what I claim as new and useful and desire to secure by Letters Patent is:

1. In a mowing machine having a tongue, and a draft connection device mounted on and depending from the tongue, a leg to engage the ground depending from the device, and means mounting said leg on the device for movement from a ground engaging position to one clear of the same.

2. A structure as in claim 1, with a horizontally extending foot rigid with the lower end of the leg.

EDWARD MOORE LOCKE.